Sept. 7, 1943.  R. R. SMITH  2,329,091
CITRUS FRUIT JUICING MACHINE
Filed June 17, 1942  3 Sheets-Sheet 1

INVENTOR.
RALSTON R. SMITH
BY Oscar A. Mellin
ATTORNEY

Sept. 7, 1943.   R. R. SMITH   2,329,091
CITRUS FRUIT JUICING MACHINE
Filed June 17, 1942   3 Sheets-Sheet 2
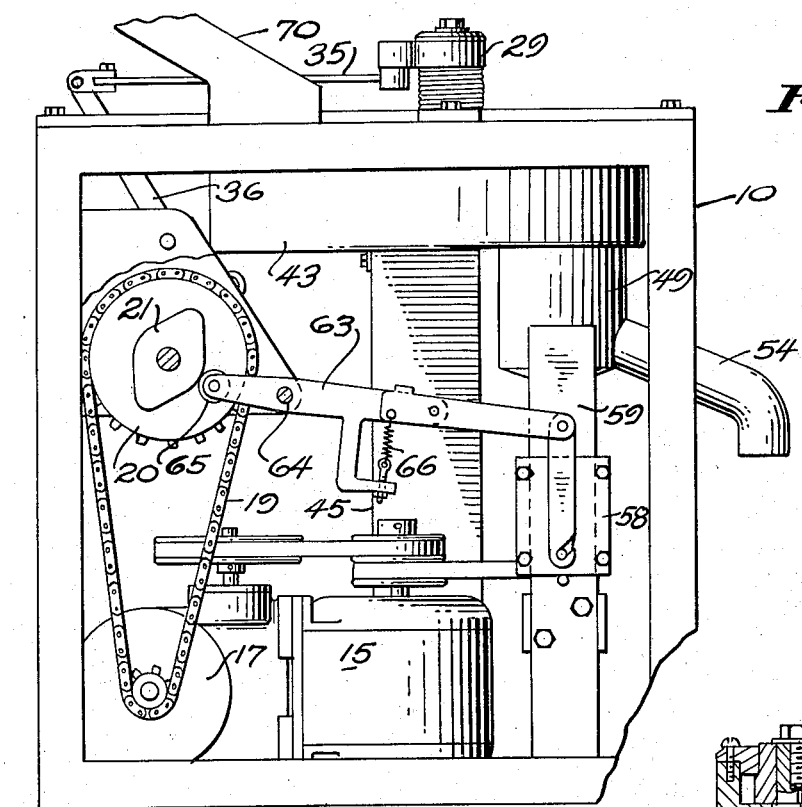
Fig. 3.
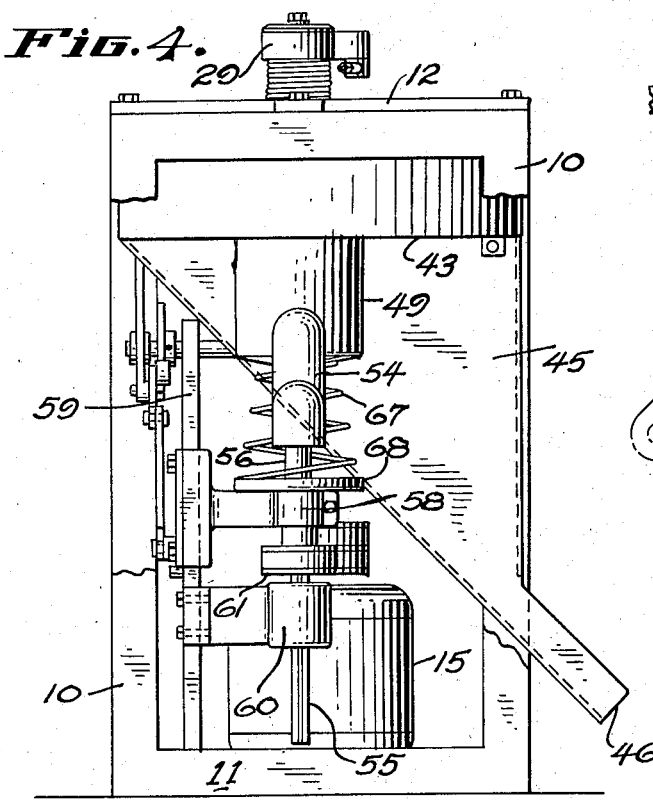
Fig. 4.
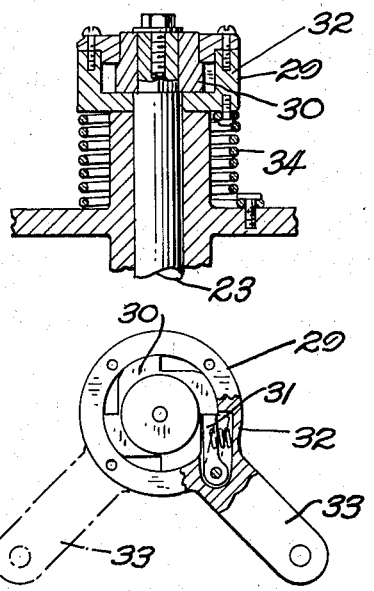
Fig. 5.
Fig. 6.
INVENTOR.
RALSTON R. SMITH
BY Oscar A. Mellin
ATTORNEYS.

Sept. 7, 1943.    R. R. SMITH    2,329,091
CITRUS FRUIT JUICING MACHINE
Filed June 17, 1942    3 Sheets-Sheet 3
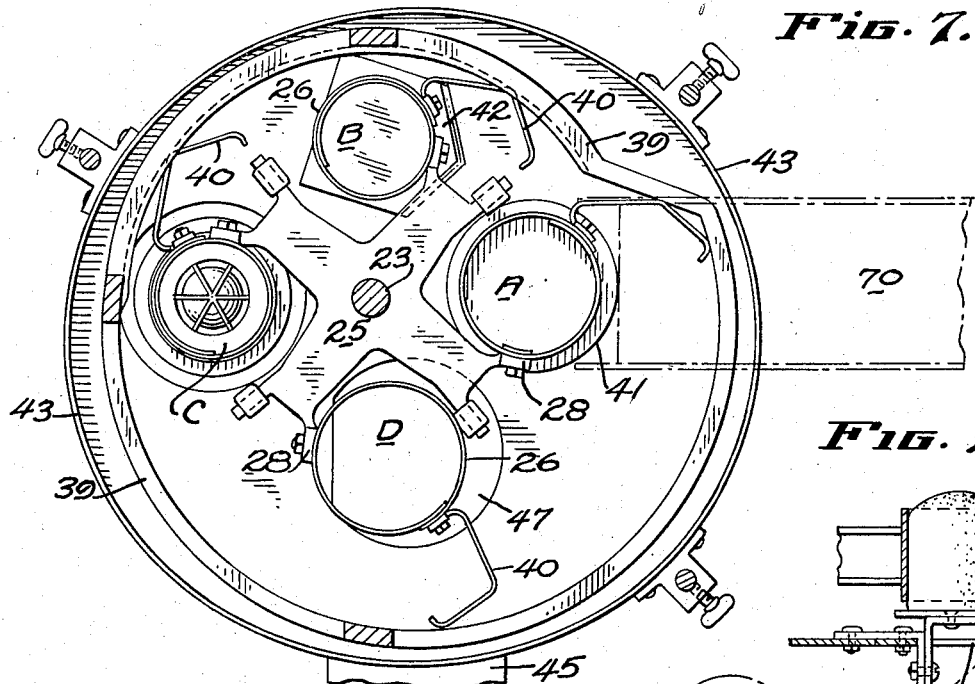
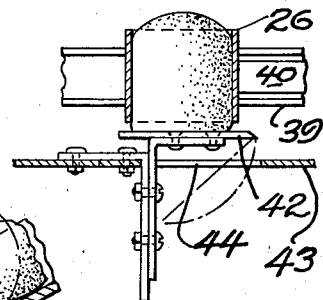
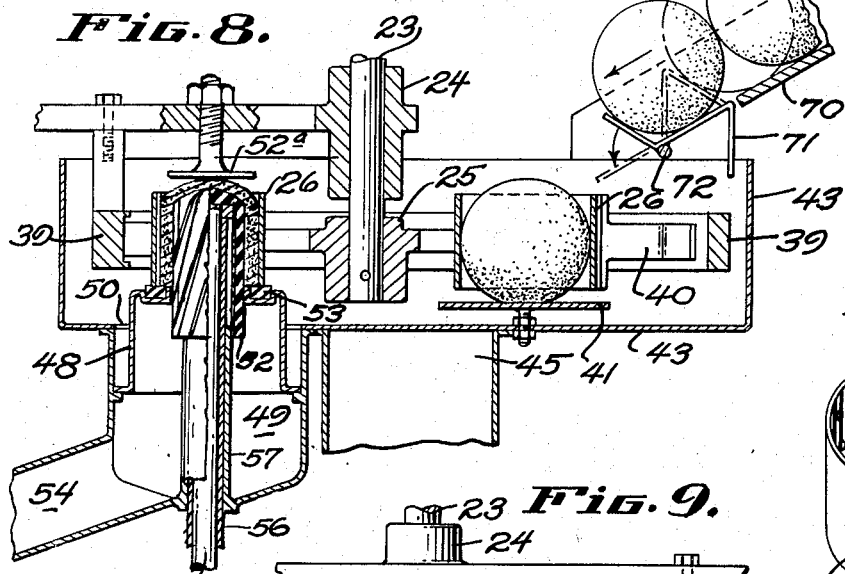
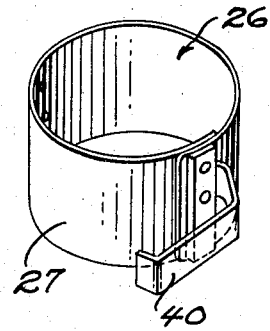
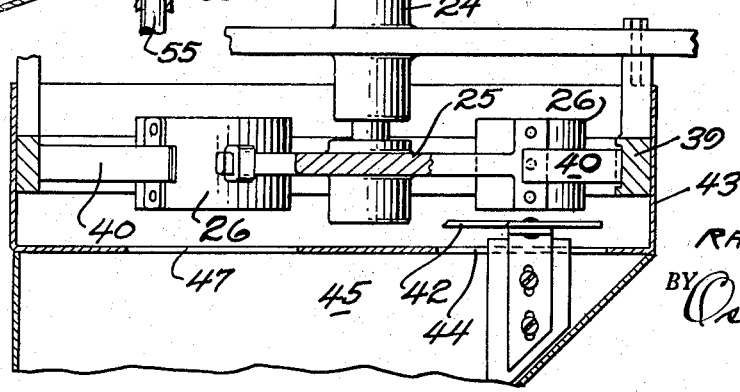
INVENTOR.
RALSTON R. SMITH
BY Oscar A. Mellin
ATTORNEY Patented Sept. 7, 1943

2,329,091

UNITED STATES PATENT OFFICE 2,329,091

CITRUS FRUIT JUICING MACHINE

Ralston R. Smith, Vallejo, Calif.

Application June 17, 1942, Serial No. 447,376

7 Claims. (Cl. 146—3)

This invention relates generally to the extracting of juices from citrus fruits, and particularly pertains to certain improvements on a fruit extracting apparatus disclosed in my United States Letters Patent No. 2,274,306.

It is the principal object of my present invention to provide an improved apparatus for efficiently extracting the juice from citrus fruit with a minimum degree of aeration and with a minimum contamination thereof with undesirable constituents present in the rind and in the tissues surrounding the juice cells or sacs, which machine is automatic in operation and requires no human labor to supplement its function.

In practicing my invention, I provide a novel and improved form of gripping mechanism for receiving a fruit, which gripping mechanism constitutes a contractile chuck for tightly gripping the fruit and successively moving it to a slicing and then a reaming station, at which points the slicing and reaming functions are performed, and then discharging the reamed shell of the fruit from the machine, while the juice extracted is separately conducted from the machine. The various mechanisms of the machine operate automatically and synchronously so that all that is necessary is to place the machine in operation and commence feeding the fruit thereto, all other operations taking place automatically as the operation of the machine continues.

The invention is exemplified in the following description and illustrated by way of example in the accompanying drawings, in which:

Fig. 3 is a side elevation of the side of the machine opposite that illustrated in Fig. 2.

Fig. 4 is an end elevation of the machine with parts of the frame broken away and shown removed so as to disclose certain operating mechanism of the machine.

Fig. 5 is an enlarged fragmentary view in vertical section through the bearing on the frame in which the chuck shaft is journaled, and disclosing the clutch mechanism for operating said shaft in central vertical section.

Fig. 6 is an enlarged view in plan and plan section of the clutch mechanism for operating the chuck shaft.

Fig. 7 is an enlarged plan view of the chuck mechanism and associated devices.

Fig. 8 is an enlarged fragmentary view in central section through the machine, disclosing the chuck mechanism in section and portions of the reaming mechanism in section.

Fig. 9 is a fragmentary view in transverse section, showing the manner of mounting the slicing knife.

Fig. 10 is a fragmentary view in section showing the manner in which the end of the fruit is sliced and discharged from the machine.

Fig. 11 is a perspective view of one of the spiral gripping or chuck members.

Figure 1:
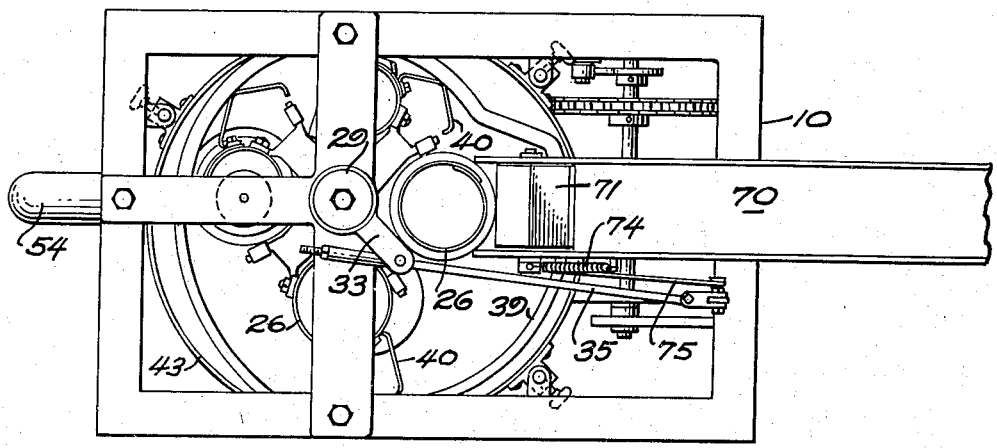
Fig. 1 is a plan view of a machine embodying the preferred form of my invention.

Referring more particularly to the accompanying drawings, I have there disclosed a citrus fruit juicing machine having an open frame structure 10. This frame includes a flat base 11 and a top 12 supported from the base by four corner legs 14 which may be welded to the top 12 and base 11 or otherwise secured thereto to provide a substantially rigid open frame structure.

There is mounted on the base 11 an electric motor 15, the shaft of which is connected through a belt drive 16 to a speed reduction set 17. Journaled on the frame is a cam shaft 18 which is driven from the speed reduction set 17 through the medium of a sprocket chain 19 and a sprocket gear 20 secured on the shaft 18. Fixed on this cam shaft 18 are two cams, a cam 21 for operating the reaming mechanism of the machine and a cam 22 for operating the chuck mechanism of the machine.

The chuck mechanism of the machine comprises a vertical shaft 23 journaled in a bearing 24 carried by the top 12 of the main frame 10. At the lower end of this shaft there is secured thereon a spider 25 which carries four individual fruit chucks 26 arranged concentrically about the axis of the shaft 23 at equal distances apart. These chucks each comprise a spiral gripping member 27 formed of a single band of spring metal or the like, the free ends of which overlap as illustrated. This spiral band is fixed to the spider 25 as at 28, which point is substantially diametrically opposite the point where the free ends of the band overlap. The inherent spring qualities of the band naturally maintain the chuck expanded, but it is obvious that by applying a moving force to one free end of the band in a winding direction, that the band will contract. It is this action which I relay upon to contract the chuck and grip a fruit which has been deposited therein.

The spider 25 is rotated step by step so that each chuck successively assumes a position at four different stations. That is to say, a fruit receiving station A, a fruit cutting station B, a fruit reaming station C, and a discharge station D, as shown in Fig. 7.

To operate the spider to successively position the chucks as just described, the shaft 23 is provided with a one-way clutch mechanism 29 which consists essentially of a four-toothed clutching dog 30 adapted to be engaged by a pawl 31 carried by a clutch ring 32 having a radially projecting crank arm 33. The movement of the crank arm 33 in one direction will engage the clutch and advance the shaft in the same direction. Movement of the crank arm in the other direction, of course, will have no effect as far as movement of the shaft 23 is concerned. A clutch spring 34 is provided which is connected with the clutch ring 32 and the frame of the machine, and constantly tends to move the clutch ring 33 in a direction releasing the clutch and repositioning it for a second operation.

To operate the crank arm 33, it is connected by means of a connecting rod 35 to one end of a clutch operating lever 36 pivoted to the frame as at 37. The other end of this lever is provided with a cam roller 38 which is engaged by the cam 22 on the cam shaft 18. This cam is so contoured that it will operate the clutch at intermittent timed intervals to rotate the shaft 23 through an arc of ninety degrees in an anti-clockwise direction. It will be noticed that the stations A, B, C and D are arranged at ninety degrees apart.

To contract and expand each chuck 26 in synchronism with its positioning at the various stations, I have provided a ring cam 39 fixed to the frame in proper relationship with respect to the axis of the shaft 23, as most clearly illustrated in Fig. 7. To engage this cam, the outer free end of the band 27 of each chuck 26 is provided with a cam shoe 40 which slidably engages the inner surface or contour of the fixed cam 39. The contour of this cam is such that when the chuck is at the receiving station A, the chuck is expanded to its full diameter. Immediately, however, the chuck commences to advance from receiving station A toward the fruit slicing station B, the action of the cam on the shoe 40 is such that the chuck commences to contract to grip the fruit so as to maintain it in the chuck. In the present application I have intended that the chuck be so tightened about the fruit that the latter is distorted to a slightly cylindrical shape. However, this is not necessary to the operation of the machine. It is only necessary in the event that it is desired merely to slice off the extreme end of the fruit and thereby ream the entire fruit in one reaming opration. In the event that only half a fruit is fed to the machine, the contraction of the band would be just sufficient to hold the fruit during the reaming operation. It will be noticed that at station A, underneath the chuck, there is a fixed platform 41 which positions the fruit in the chuck as far as vertical position is concerned.

By the time that the chuck is moved from station A to a point where the fruit is out of register with the platform 41, the chuck is fully contracted and has tightly gripped the fruit, as described. Just prior to reaching complete register with station B, the lower end of the fruit comes into alignment with a slicing or severing knife 42 which is mounted in a fixed position beneath the spider and chuck, as most clearly illustrated in Figs. 7, 9 and 10. As the fruit passes over this slicing knife 42 to completely register with station B, the knife has severed off the lower end of the fruit.

During this period the chuck is maintained fully contracted and so remains until it has been registered with station C, at which point the reaming takes place, as will be described. From the station C to station D the cam commences to permit expansion of the chuck so that when it reaches the station D, the fruit may fully discharge therefrom.

Underlying and surrounding the chuck mechanism is a circular pan 43 rigidly carried by the frame. The bottom of this pan supports the platform 41 and the knife 42, as illustrated. At a point under the knife 42, the bottom of the pan is provided with an aperture 44 through which the sliced off portion of the fruit may discharge into a hopper 45 which has an outlet 46 at one side of the machine. Also registering with this hopper is a discharge opening 47 at station D so that when the fruit is released by the chuck, it may discharge through the discharge opening 47 into the hopper and be discharged with the sliced off ends at the outlet 46 thereof.

In alignment with the station C, the bottom of the pan 43 is provided with an opening 50 through which upwardly projects an inverted cup 48. Formed concentrically with this cup, but of a diameter slightly larger than the same is a cylindrical juice receiving chamber 49. The diameter of the chamber 49 is larger than the opening 50. The lower marginal edge of the inverted cup 48 is out-turned and secured to the inner periphery of the chamber 49, as illustrated, forming a joint therebetween which is perforate.

The upper end of the inverted cup 48 is provided with a central opening 51 of a diameter just slightly greater than a reamer 52 which operates therethrough into the fruit. Surrounding this opening 51 is a circular resilient washer or ring 53 which engages the bottom of the chuck as the latter advances to station C. Thus, when the fruit is positioned at station C, a substantially tight joint is formed between the bottom of the chuck and the washer 53 so that as the fruit is juiced, the juice will pass downwardly between the flutes in the reamer and discharge into the fruit juice receiving chamber 49. This receiving chamber 49 has a discharge spout 54 which extends laterally outward to direct the juice to a suitable container.

The cylindrical chamber 49 rests upon a coil spring 67 which in turn abuts against a collar 68 on the sleeve 56. When the reamer is lowered, the chamber 49 together with the inverted cup 48 likewise lowers a slight amount so as not to interfere with the movement of the chuck passing from station C to station D. However, when the chuck has assumed the position at station D and the reamer is elevated, the inverted cup 48 and the chamber are moved upwardly and yieldingly pressed against the bottom of the chuck as illustrated in Fig. 8.

It will be noticed that the shaft 55 of the reamer 52 projects concentrically upwardly through the bottom of the juice receiving chamber 49 in a fluid-tight manner. That is to say, the shaft 55 is journaled in a sleeve 56 which is reciprocable through a bearing 57 in the bottom of the juice receiving chamber 49. The sleeve 56 and the shaft 55 reciprocate in unison, although the shaft 55 revolves in the sleeve 56. The sleeve 56 is fixed at its lower end in a bearing 58 reciprocably mounted on a vertical guide 59 fixed to the frame. The shaft 55 is journaled at its lower end in a bearing 60 rigidly fixed to the guide 59. The shaft 55 is feathered through a collared pulley 61 which is driven by a belt 62 from the meter 15. It is obvious that by imparting vertical movement in an upward direction to the sleeve 56, the reamer 52 will likewise be moved vertically in unison therewith.

To impart such movement to the reamer in synchronism with the operation of the chuck mechanism, I have provided a jointed fulcrum lever 63 which is pivoted to the frame as at 64. One end of the lever is provided with a cam roller 65 which engages the cam 21 on the cam shaft 18. This cam is so contoured and so related to the cam 22, which intermittently operates the chuck mechanism, that the reamer is raised and lowered during each idle period of the chuck mechanism each time a chuck is registered with station C. The other end of the fulcrum lever 63 is connected with the sliding bearing 58 which carries the sleeve 56, so that when the cam rise commences to engage the roller 65, that end of the fulcrum lever is depressed, elevating the opposite end and thereby elevating the reamer and projecting it into the fruit. The lever, however, is centrally jointed, as illustrated, so that when the resistance of the reamer to axial movement overcomes the tension of a spring 66, which holds the jointed portions of the lever in alignment, the reamer will stop elevating regardless of whether or not the high point of the cam has been reached.

Figure 2:
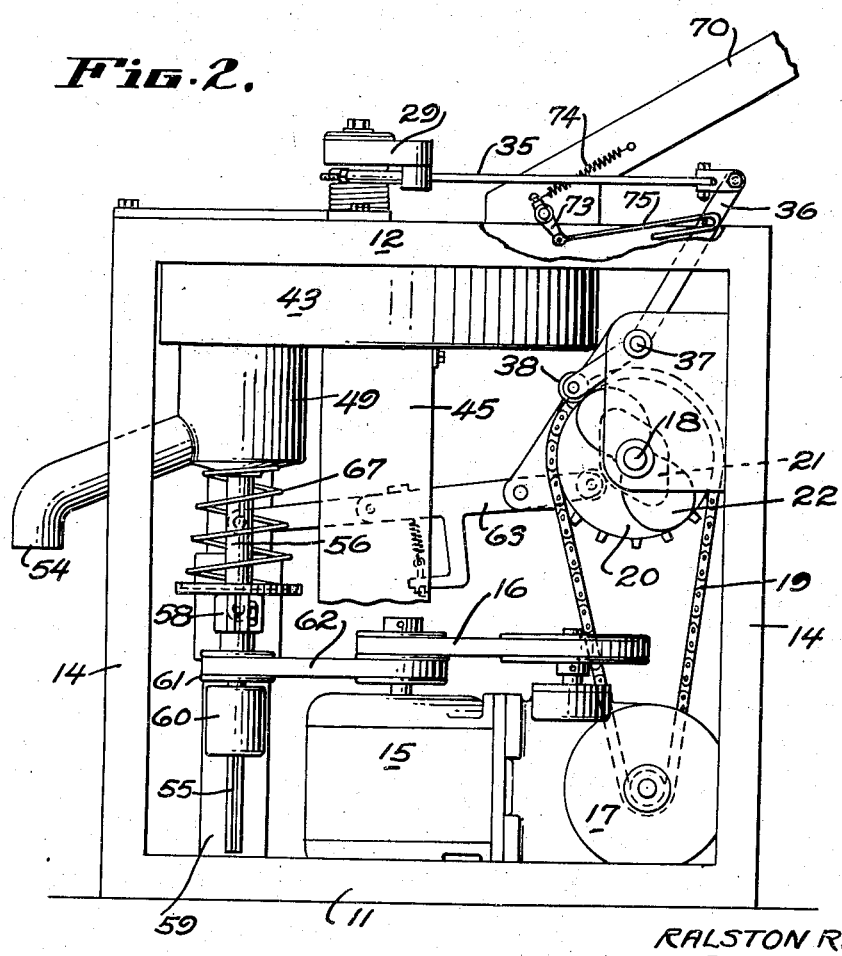
Fig. 2 is a side elevation of that machine with parts broken away to more clearly disclose certain operating mechanism of the machine.

I have also provided a means for delivering fruit to the chucks as they successively reach station A, which mechanism comprises a chute 70 down through which the fruit moves by gravity in line formation. A gate 71 is provided which, when operated, allows the foremost fruit to discharge from the chute into the chuck positioned at station A, but restraining the succeeding fruit from discharging from the chute 70. This gate is operated once during each step of the cycle of operation of the chuck mechanism. It is seen that the shaft 72 of the gate 71 is provided with a crank arm 73. A spring 74 is attached to this crank arm, as illustrated in Fig. 2, and normally maintains the gate in a position preventing fruit from discharging from the chute 70, as illustrated in Fig. 8. This crank arm is likewise connected by a connecting link 75 to the clutch operating lever 36 in such a fashion that each time the lever 36 is operated to advance the chucks through one step of their cycle of operation, the gate 71 is operated to permit one fruit to discharge from the chute 70 into the chuck registering with station A.

In operation of the device, the machine is constructed substantially as illustrated and described, and the motor 15 is placed in operation. A fruit is fed to the chute 70 so that the lowermost thereof will position itself against the gate 71. As the machine commences to function, the cam 22 will operate the lever 36 to advance a chuck from station D to station A, at which point the chucks will be fully expanded. During this operation the gate 71 will be operated to allow one fruit to discharge into the chuck registering with station A. Upon the second step of operation of the chuck mechanism, the cam will cause the chuck receiving the fruit to contract, as previously described, and carry the fruit to station B, during which movement the knife 42 will slice off the lower exposed end of the fruit and allow such severed end to discharge through the aperture 44 into the hopper 45 for discharge from the machine. Of course, during the advance of the chuck holding the fruit from station A to station B, the succeeding chuck will align at station A and receive a fruit.

During the succeeding step of operation, the chuck at station B will advance to station C in register with the reaming mechanism. At this point the cam 21 will operate the fulcrum lever 63 to elevate the reamer 52 and project it into the fruit, during which time the reamer will be revolving to ream the same. If preferred, a gage block 52a may be provided on the frame to prevent displacement of the fruit from the chuck, as illustrated in Fig. 8. The reaming takes place, of course, during the rest period between the steps of operation of the chuck mechanism. Immediately the fruit is reamed, the reamer 52 is lowered and the chuck mechanism advances another step. During this step the chuck holding the fruit that has just been reamed commences expanding so that by the time it reaches station D, it will have been fully expanded and released the shell of the fruit so that the latter may discharge through the aperture 47 into the hopper 45. The juice, of course, will pass between the flutes of the reamer and into the fruit container or chamber 49 and discharged through the spout 54 thereof.

I may prefer to use a reamer with flexible flutes such as disclosed in my United States Letters Patent No. 2,274,306.

The various unit mechanisms of the machine are, of course, as previously described, relatively timed to perform their respective functions in the desired sequence, the apparatus as a whole providing an automatic machine effecting a continuous unit handling of the fruit with complete elimination of human labor and in a manner which will effectively extrude a maximum percentage of the desired fruit juice and a minimum percentage of the rind oil, the bitter substances and other undesirable elements present in the peel and in the seeds and in the carpellary membranes and the vascular elements of the fruit.

It should also be noted that the present machine will not ream a hard frost-bitten fruit. That is to say, the reamer will not penetrate into such a fruit because of the knuckle or hinged construction of the reamer operating lever 63, as previously described. It may be pointed out here that after the fruit is reamed, the resilient character of the shoe 40 will cause the spiral chuck or gripping members 27 to slightly contract so as to insure a tight grip on the reamed fruit shell.

I also desire to point out that if desired, the inner surface or perimeter of the chuck bands 27 may be lined with a yielding substance, such as sponge rubber. However, this is not necessary to a proper operation of the machine.

While I have herein illustrated and described the preferred form of my invention, it is to be understood that various changes may be made therein by those skilled in the art without departing from the spirit of the invention as defined in the appended claims.

Having thus described my invention, what I claim and desire to secure by Letters Patent is:

1. In a machine of the character described, a chuck comprising a spiral band held at one point, the ends of said band being free and overlapping, and cam means to engage one end of said band to cause contraction thereof and to control the expansion of the band throughout a predetermined cycle of operation.

2. In a machine of the character described, a fruit holding chuck comprising a band of spring material wound substantially in a circle and having an inherent tendency to expand, a member to which said band is fixed at one point, the ends of said band being unconnected and overlapping, and cam means to engage one end of said band to cause contraction of said band throughout a predetermined cycle of operation and to control expansion thereof.

3. In a machine of the character described, a fruit holding chuck comprising a flat band of spring metal wound spirally and having an inherent constant tendency to expand, and cam means engaging one end of said band to cause contraction thereof and to control the expansion thereof by movement of said end in a circumferential path with relation to the axis of the band.

4. A machine of the character described comprising a revoluble member operated throughout a predetermined cycle of operation, a fruit holding chuck carried by said member and comprising a band of spring material wound substantially in a circle and connected to said revoluble member intermediate its ends, the ends of said band being unconnected, a stationary cam associated with the revoluble member and adapted to operatively engage one end of said band to cause contraction of the band and to control its expansion in synchronism with the operation of the revoluble member.

5. A machine of the character described comprising a revoluble member adapted to be intermittently revolved in one direction step by step through a predetermined cycle of operation, a fruit holding chuck fixed to said revoluble member and comprising a flat band of spring material wound spirally about a vertical axis and having an inherent and constant tendency to expand, said band being fixed to said revoluble member intermediate its ends and having its ends unconnected, and a stationary cam associated with said revoluble member to engage one end of said band to cause contraction of the chuck and to control its expansion in synchronism with the operation of the revoluble member.

6. In a machine of the character described, a revoluble member driven to intermittently advance in one direction step by step, a fruit holding contractile chuck carried by said member, said chuck comprising a flat band of material wound in substantially circular fashion and normally expanded to a diameter sufficient that it may receive a fruit, said band being connected to the revoluble member at a point intermediate its ends, and cam means associated with said band to operate the same as the revoluble member operates through its cycle to cause contraction of the chuck and to control its expansion in synchronism with the operation of the revoluble member.

7. A machine of the character described comprising a revoluble member adapted to be driven intermittently throughout a predetermined cycle of operation, a plurality of chucks carried by said revoluble member at equal distances about its axis, each chuck comprising a flat band of spring material wound spirally about a vertical axis and having an inherent constant tendency to expand, each band being fixed to said revoluble member at a point intermediate its ends and normally expanded to a diameter enabling it to receive a fruit, the ends of each band being unconnected, a circular stationary cam being arranged about the axis of the revoluble member and constantly engaging all of the chucks and adapted to cause contraction thereof and to control the expansion thereof in synchronism with the operation of the revoluble member.

RALSTON R. SMITH.